United States Patent [19]
Ono

[11] Patent Number: 5,203,868
[45] Date of Patent: Apr. 20, 1993

[54] WIRE DISCONNECTION DIAGNOSIS APPARATUS OF FUEL INJECTOR DRIVE CIRCUIT

[75] Inventor: Fujio Ono, Iseaki, Japan

[73] Assignee: Japan Electronic Control Systems Co., Ltd., Isesaki, Japan

[21] Appl. No.: 774,973

[22] Filed: Oct. 15, 1991

[30] Foreign Application Priority Data

Oct. 15, 1990 [JP] Japan .................................. 2-273281

[51] Int. Cl.$^5$ ............................................ G01M 19/00
[52] U.S. Cl. ................................... 73/119 A; 324/546
[58] Field of Search ............... 73/119 A; 324/418, 546, 324/654

[56] References Cited
FOREIGN PATENT DOCUMENTS 60-134870 9/1985 Japan .
113694 5/1989 Japan .................................. 324/546
2-130261 5/1990 Japan .

Primary Examiner—Jerry W. Myracle
Attorney, Agent, or Firm—Foley & Lardner

[57] ABSTRACT

The present invention relates to an apparatus for diagnosing the presence or absence of a wire disconnection in a fuel injector drive circuit.

When driving the solenoid of a fuel injector via a transistor by a drive pulse signal, the counter electromotive voltage used to turn off the transistor during a fall of a drive pulse signal is taken out and is charged to a capacitor included in the charge/discharge circuit. Also, the terminal voltage of the capacitor is determined during the rise of the drive pulse signal, and a wire disconnection is detected when the voltage is lower than a predetermined value. Further, a discharge of capacitor is started immediately after this determination, and a discharge of the capacitor is ended upon the fall of the drive pulse signal.

3 Claims, 4 Drawing Sheets

WIRE DISCONNECTION DIAGNOSIS APPARATUS OF FUEL INJECTOR DRIVE CIRCUIT

BACKGROUND OF THE INVENTION (1) Field of the Invention

The present invention relates to a wire disconnection diagnosis apparatus of a fuel injector drive circuit used for an electronically controlled fuel injector of an internal combustion engine.

(2) Description of the Related Art

In an electronically controlled fuel injector of an internal combustion engine, an electromagnetic system fuel injector is provided at each cylinder, or commonly to all the cylinders, in the engine intake system.

One end of a solenoid of this fuel injector is connected to a power source, and the other end is grounded via transistors. The transistors are electrified by a drive pulse signal (Ti pulse) output in synchronization with the revolutions of engine, while the solenoid is thus magnetized and the needle valve of the fuel injector is then opened for the fuel injection.

Further, during the fall of the Ti pulse, the transistors are turned off and the solenoid is demagnetized, whereby the needle valve is opened to stop the fuel injection. During this period, however, a counter electromotive voltage is generated at the solenoid, after an elapse of a predetermined time from the fall of the Ti pulse.

Here, from the presence/absence of a counter electromotive voltage generated at the solenoid when the electric power is shut off, a wire disconnection in the fuel injector drive circuit is diagnosed (see Japanese Unexamined Patent Publication (Kokai) No. 2-130261).

Namely, the counter electromotive voltage at the solenoid is taken out and input to a discharge circuit via an amplitude circuit and a waveform shaping circuit. This discharge circuit is composed of a capacitor charged via a diode and a transistor connected in parallel with the capacitor for discharging the capacitor during the supply of electric power.

The discharge potential (the terminal voltage at the capacitor) of the charge/discharge circuit is determined by a microcomputer during the generation of a reference signal output at a predetermined crank angle by a crank angle sensor, and a wire disconnection is detected when the potential is lower than a predetermined value. Further, by outputting a clear signal to turn on the transistors in the charge/discharge circuit immediately after this determination, the capacitor is discharged and is ready for the next charge.

According to this type of wire disconnection diagnosis apparatus, the waveform shaping is provided only at the portion corresponding to the counter electromotive voltage from the drive waveform signals generated at the solenoid, to keep the capacitor charged, and a wire disconnection in fuel injector drive circuit can be diagnosed by determining whether the terminal voltage at the capacitor is at a high or low level during the generation of reference signals from the crank angle sensor. Namely, the absence of a wire disconnection (OK) is diagnosed when the terminal voltage at the capacitor is at a high level, and the presence of a wire disconnection (NG) is diagnosed when the terminal voltage of capacitor is at a low level.

In the wire disconnection diagnosis apparatus of this type of fuel injector drive circuit, however, a predetermined time must pass from the start to the end of the discharge, and during the discharge, the clear signal must be maintained at a high level for this predetermined time, and thus the time must be controlled by a software timer, to maintain the clear signal at a high level, and therefore, a problem exists in that a load on the software is increased by that portion with a resultant overloading of the software.

The terminal voltage of capacitor is determined by the generation of reference signals from the crank angle sensor, but when the fuel injection timing deviates to a delay side due to the generation of reference signals during the generation of a counter electromotive voltage, and the capacitor has not yet been charged, although a determination can be made, a problem exists in that an erroneous determination may be made at that time.

SUMMARY OF THE INVENTION

An object of this invention is to provide a wire disconnection diagnosis unit of a fuel injector drive circuit that can reduce the load on the software and further avoid an erroneous determination due to the above-described problem.

Accordingly, this invention provides a wire disconnection diagnosis apparatus of a fuel injector drive circuit having a structure comprising:

a fuel injector drive circuit for driving the solenoid of a fuel injector via transistors to be turned on by drive pulse signals, a charge/discharge circuit charged by a counter electromotive voltage of a solenoid used for turning off said transistors during a fall of the drive pulse signals and discharged when clear signals are received, a determining means for determining a discharge potential of said charge/discharge circuit during the rise of the drive pulse signals and for detecting a wire disconnection when the potential is lower than a predetermined value.

a discharge starting means for starting an output of clear signals to the charge/discharge circuit immediately after the determination by said determining means, and a discharge ending means for ending the output of said clear signals during a fall of said drive pulse signals.

In a normal situation in which wire disconnection does not exist in the fuel injector drive circuit in the apparatus, a counter electromotive voltage is generated at the solenoid when the solenoid drive transistors of the fuel injector have been turned off, and this voltage is applied to the charge/discharge circuit to provide a higher charge potential.

In an abnormal situation in which a wire disconnection exists in the fuel injector drive circuit, no voltage is charged to the charge/discharge circuit, and the charge potential remains at a low level because a counter electromotive voltage is not generated.

The charge potential of said charge/discharge circuit is determined by the determining means during the rise of drive pulse signal, and a wire disconnection is detected when the potential is lower than the predetermined value.

Immediately after the determination, a clear signal to the charge/discharge circuit is output by the charge/discharge starting means, and the output of clear signal is ended by the charge ending means during the fall of drive pulse signal, in preparation for a charge.

By setting the output period of the clear signal to be equal to the time from the rise of drive pulse signal to the fall of said signal, the wire disconnection can be diagnosed correctly without any special time control.

Also, the charge/discharge circuit can include a capacitor charged by the counter electromotive voltage of the solenoid via the diode, and a transistor connected in parallel with said capacitor, for discharging the capacitor when a voltage is applied due to the clear signal.

Further, if the determining means is able to detect a wire disconnection when the charge potential of the charge/discharge circuit is lower than the predetermined value has continued for longer than the predetermined time, a correct wire disconnection diagnosis can be made regardless of the influence of an instantaneous wire disconnection.

The structure of this invention, and the actions and effects obtained by the structure are further clarified by the embodiments being shown below.

DESCRIPTION OF THE PREFERRED EMBODIMENTS

Figure 1:
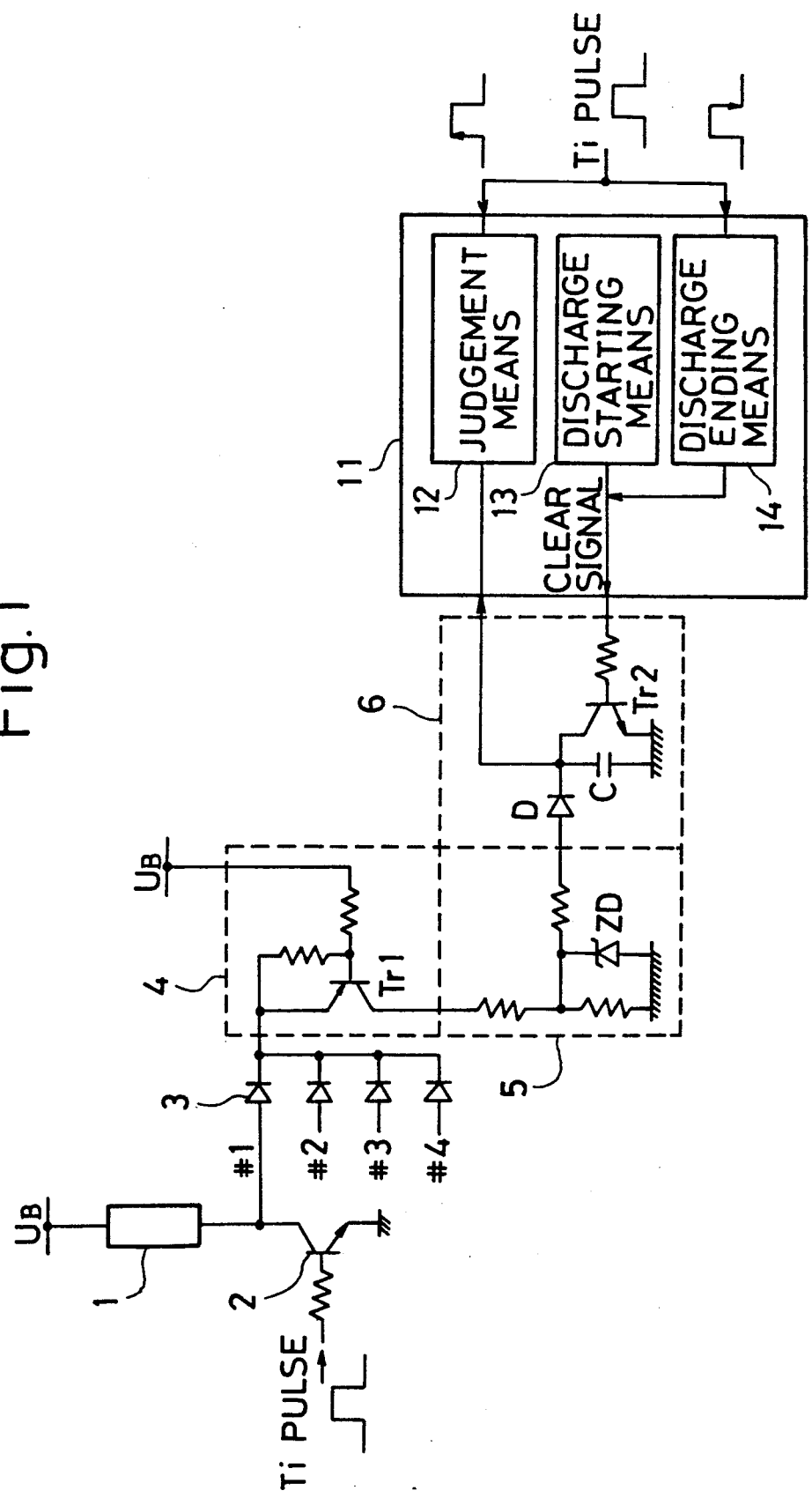
FIG. 1 is a circuit diagram of a wire disconnection diagnosis unit showing an embodiment of this invention.

FIG. 1 shows a circuit structure of a wire disconnection diagnosis apparatus of a fuel injector drive circuit, wherein one end of the solenoid 1 of a fuel injector installed at each cylinder in the engine intake system is connected to the power source $U_B$, and the other end of the solenoid 1 is grounded via a transistor 2. A voltage is applied to the transistor 2, and the solenoid 1 is actuated by a drive pulse signal (Ti pulse) output in synchronization with the engine speed, hereby the needle valve of the fuel injector is opened to start the fuel injection.

During the fall of the Ti pulse, the transistor 2 is turned off and the solenoid 1 is demagnetized, and accordingly, the needle valve of the fuel injector is shut by a spring fitted inside the needle valve, to stop the fuel injection. In this case, a counter electromotive voltage (see the drive waveform in FIG. 2) is generated by the solenoid 1 with a delay of a predetermined time from the fall of the Ti pulse.

Consequently, a wire disconnection in fuel injector drive circuit is diagnosed from the presence or absence of counter electromotive voltage applied to the solenoid 1 when the current thereto is cut off.

Therefore, the counter electromotive voltage of solenoid 1 is taken out via a diode 3, amplified by an amplitude circuit 4 including a transistor $Tr_1$, and is converted into a square pulse by a waveform shaping circuit 5 including a Zener diode ZD, and this pulse is then input to a charge/discharge circuit 6.

The charge/discharge circuit 6 includes a capacitor C charged via a diode D and a transistor $TR_2$ connected in parallel with the capacitor C and discharging the capacitor C when a voltage is not applied.

A microcomputer 11 is provided, and the charge potential (the terminal voltage of capacitor C) of a charge/discharge circuit 6 together with the Ti pulse to the transistor 2 for driving the solenoid 1 are input to the said microcomputer 11. Note, the output of the Ti pulse is operated and controlled by the microcomputer 11.

A determining means 12, a discharge starting means 13, and a discharge ending means 14 are provided, as software, to the microcomputer 11.

The determining means 12 determines the terminal voltage level of capacitor C when the Ti pulse has risen.

Immediately after the determination by the determining means 12, the discharge starting means 13 starts the discharge of capacitor C by raising the clear signal applied to the base terminal of transistor $TR_2$ to a high level and applying a current to the transistor $TR_2$.

When the Ti pulse has risen, the discharge ending means 14 ends the discharge of capacitor C by lowering the level of the clear signal to thereby turn off transistor $TR_2$, and prepare for a charge.

Figure 2:
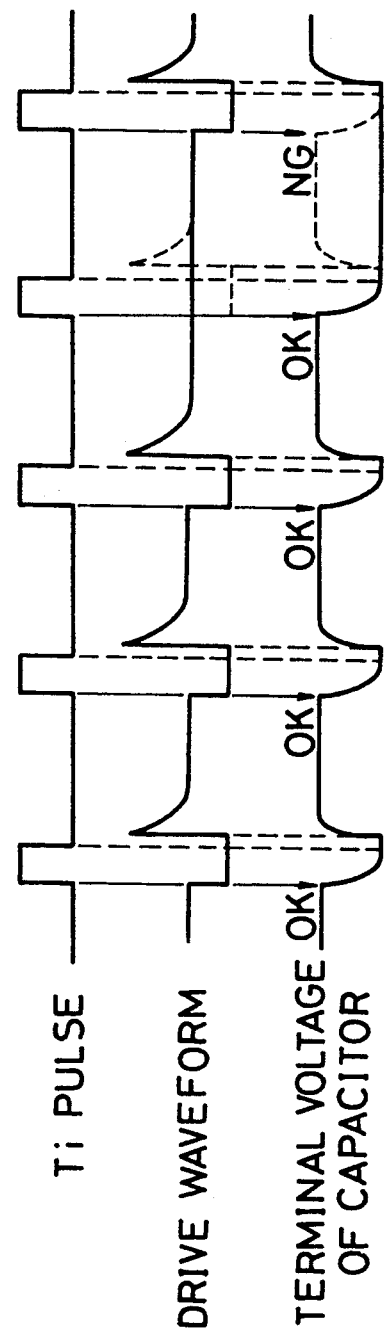
FIG. 2 is a signal waveform diagram of the aforesaid circuit.

Namely, as shown in FIG. 2, the terminal voltage level of the capacitor C is determined when the Ti pulse has risen, the capacitor C is discharged immediately after determination, and the discharge is ended when the Ti pulse has fallen, to prepare for the next determination.

Next, concrete examples of the software structure are described with reference to the flow charts in FIG. 3 through FIG. 6.

Figure 3:
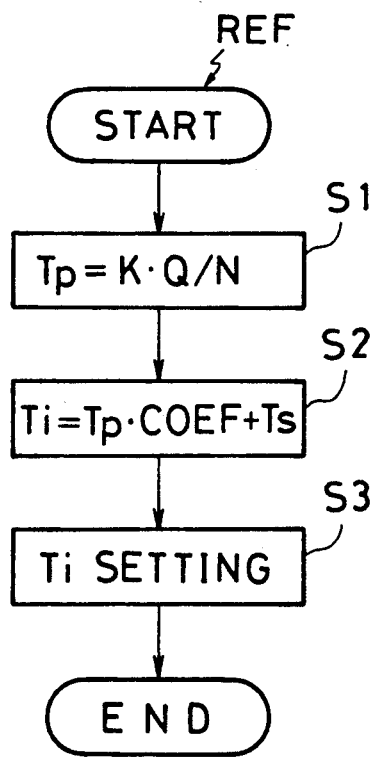
FIG. 3 is a flow chart of a Ti preset routine.

FIG. 3 shows a Ti preset routine, executed in synchronization with a reference signal (FEF) output at a predetermined crank angle by the crank angle sensor.

At Step 1 ("S1" in the figure, and hereunder referred to in a similar manner), the basic fuel injection volume $Tp=K.Q/N$ (K is a constant) is set from the intake air flowrate "Q" and the engine speed "N".

At Step 2, the basic fuel injection volume Tp is corrected by correction coefficients COEF and a voltage correction portion Ts, to set the final fuel injection volume (fuel injection time) Ti=Tp. COEF+Ts. At Step 3, this Ti is set to the register and the routine is ended.

Figure 4:
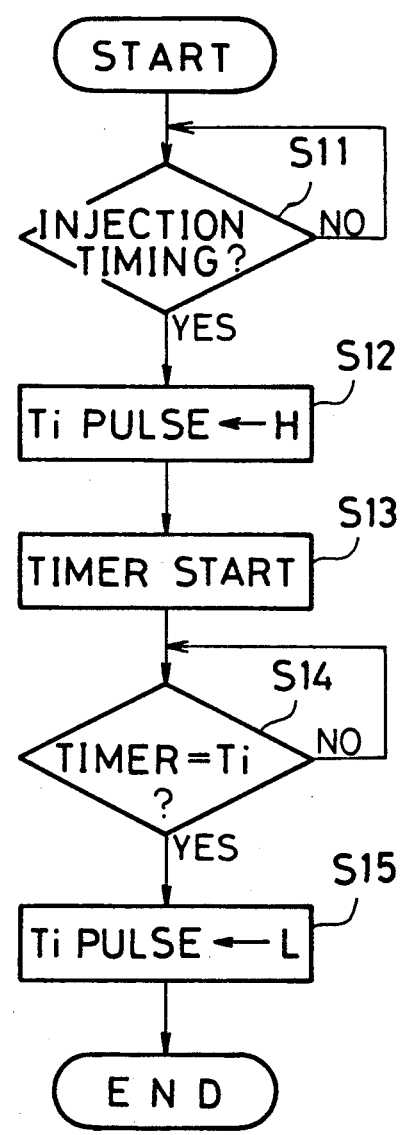
FIG. 4 is a flow chart of a Ti pulse preset output routine.

FIG. 4 is a Ti pulse output routine.

At step 11, it is determined whether or not a given injection timing is set, and when the injection timing is reached, the flow advances to Step 12, the Ti pulse is raised to a high level (H), and the fuel injection is started. Simultaneously, at Step 13, a Ti counting timer is started.

Thereafter, at Step 14, it is determined whether or not the value of timer is equal to Ti, and if so, the flow proceeds to Step 15, and the Ti pulse is made low level (L) to stop the fuel injection, and this routine is ended.

Figure 5:
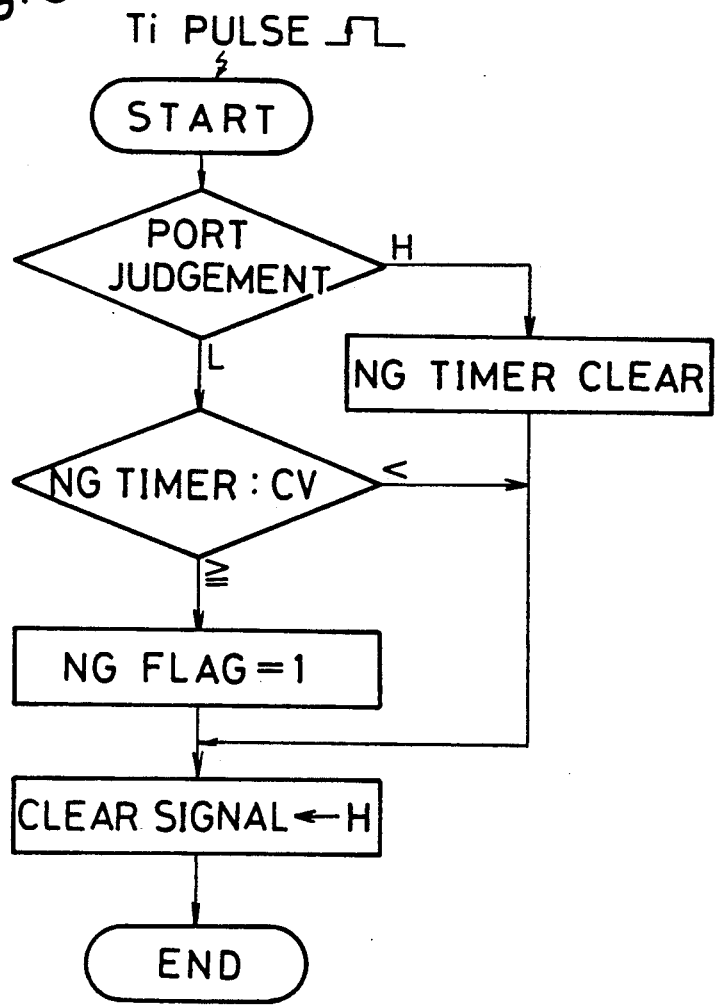
FIG. 5 is a flow chart of a wire disconnection determination and discharge starting routine.

FIG. 5 shows a wire disconnection determination and discharge starting routine, executed in synchronization with a rise of Ti pulse (Step 12 of FIG. 4).

At Step 21, the voltage level at the input port of the microcomputer 11, to which the terminal voltage of capacitor C is input, is determined.

When the port voltage is at a high level (H), the counter electromotive voltage has been applied to the capacitor C, and the fuel injector has been normally driven without a wire disconnection in the fuel injector drive circuit, and thus the flow advances to Step 22 and clears the NG timer.

When the port voltage is at a low level (L), the counter electromotive voltage has not been applied to the capacitor C, and the flow proceeds to Step 23 so that an instantaneous disconnection cannot be detected, and then it is determined whether the NG timer has reached a predetermined value CV (for example, 5 seconds). When the predetermined value CV has been reached, the flow advances to Step 24 and an NG flag is set. Namely, if a counter electromotive voltage is not generated for the predetermined time, a diagnosis is made that a wire disconnection exists in the fuel injector drive circuit (NG).

After this determination of a wire disconnection, the flow advances to Step 25, and a clear signal is made high level (H), to start the discharge, and this routine is ended.

Figure 6:
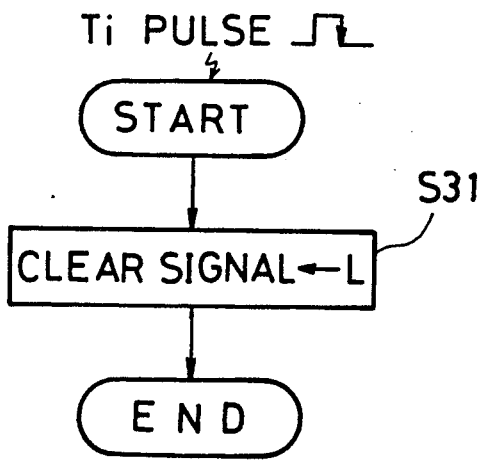
FIG. 6 is a flow chart of a discharge ending routine.

FIG. 6 is a discharge ending routine, executed in synchronization with a fall of the Ti pulse (Step 15 of FIG. 4).

At Step 31, the clear signal is made low level (L), to end the discharge, and this routine is ended.

Steps 21 through 24 correspond to the determination means, Step 25 to the discharge starting means, and Step 31 to the discharge ending means.

As explained above, because the wire disconnection diagnosis of fuel injector drive circuit is executed at the rise of the Ti pulse, the discharge of the charge/discharge circuit is started immediately after the execution of the diagnosis and the discharge is ended by a fall of the Ti pulse, the load on software is reduced because the duration of the discharge need not be controlled by the software.

Further, because the determination and discharge timing is in synchronization with the Ti pulse, which allows the generation of a counter electromotive voltage, and effect can be obtained such that inconvenience of a deviation of the timing does not occur even if the operation situation changes.

I claim:

1. A wire disconnection diagnosis apparatus for a fuel injector drive circuit, comprising:
    a fuel injector drive circuit for driving a solenoid in a fuel injector via a first transistor turned on by a drive pulse signal;
    a charge/discharge circuit charged by the counter electromotive voltage of said solenoid for turning off said first transistor during a fall of said drive pulse signal, said charge/discharge circuit being discharged upon the reception of a clear signal;
    a determining means for determining the charge potential of said charge/discharge circuit during the rise of said drive pulse signal and for detecting a wire disconnection when said potential is lower than a predetermined value;
    a discharge starting means for starting an output of said clear signal to said charge/discharge circuit immediately after the determination by said determining means; and
    a discharge ending means for ending said output of said clear signal during the fall of said drive pulse signal.

2. A wire disconnection diagnosis apparatus for a fuel injector drive circuit according to claim 1, wherein said charge/discharge circuit comprises a capacitor charged by the counter electromotive voltage of said solenoid via a diode, and a second transistor connected in parallel with said capacitor and discharging said capacitor when the current is cut off by said clear signal.

3. A wire disconnection diagnosis apparatus of a fuel injector drive circuit according to claim 1, wherein the determining means detects the wire disconnection when the charge potential of said charge/discharge circuit has continued to have a value lower than the predetermined value for a time longer than the predetermined time.

* * * * *